(12) United States Patent
Sbeiti et al.

(10) Patent No.: US 10,469,454 B2
(45) Date of Patent: Nov. 5, 2019

(54) DIGITAL IDENTITY

(71) Applicant: Deutsche Telekom AG, Bonn (DE)

(72) Inventors: Mohamad Sbeiti, Recklinghausen (DE); Tobias Wernado, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 129 days.

(21) Appl. No.: 15/708,170

(22) Filed: Sep. 19, 2017

(65) Prior Publication Data

US 2018/0083960 A1  Mar. 22, 2018

(30) Foreign Application Priority Data

Sep. 20, 2016  (EP) .................................... 16020338

(51) Int. Cl.
*H04L 29/06* (2006.01)
*G06F 21/40* (2013.01)
(Continued)

(52) U.S. Cl.
CPC .......... *H04L 63/0421* (2013.01); *G06F 21/30* (2013.01); *G06F 21/40* (2013.01);
(Continued)

(58) Field of Classification Search
CPC ...... G06F 21/6254; G06F 21/41; G06F 21/30; H04L 63/0421; H04L 63/0815; H04L 9/3236; H04W 12/02
See application file for complete search history.

(56) References Cited

U.S. PATENT DOCUMENTS 7,620,606 B2  11/2009  Gentry et al.
8,171,536 B2  5/2012  Wagner et al.
(Continued)

FOREIGN PATENT DOCUMENTS

JP  2007505555 A  3/2007
JP  2010531005 A  9/2010
(Continued)

OTHER PUBLICATIONS

Alhaqbani et al., "Privacy-Preserving Electronic Health Record Linkage Using Pseudonym Identifiers", pp. 108-117 (Year: 2008).*
(Continued)

*Primary Examiner* — Thaddeus J Plecha
(74) *Attorney, Agent, or Firm* — Leydig, Voit & Mayer, Ltd.

(57) ABSTRACT

A system for providing a user with access to different services of at least one service provider in a network considering privacy and security via a user-related unique digital identifier (D-ID). The system includes: a D-ID middleware; and a D-ID-agent. The D-ID agent is at least partly run on a terminal device of a user and is configured to: generate the D-ID, at least one pseudonym for the user, and a user-defined and pseudonym-specific number of secrets; compute, using the number of secrets and a cryptographic hash function, a root value of a pseudonym-specific Merkle-tree having the secrets as its leafs; transmit the at least one pseudonym and the corresponding root value, both encrypted, to the D-ID middleware; and use a secret of the number of secrets as needed to access a desired service of the different services of the at least one service provider.

15 Claims, 6 Drawing Sheets

(51) Int. Cl.
*G06F 21/30* (2013.01)
*G06F 21/62* (2013.01)
*G06F 21/41* (2013.01)
*H04L 9/32* (2006.01)
*H04W 12/02* (2009.01)

(52) U.S. Cl.
CPC .......... *G06F 21/41* (2013.01); *G06F 21/6254* (2013.01); *H04L 9/3236* (2013.01); *H04L 63/083* (2013.01); *H04L 63/0815* (2013.01); *H04L 63/0853* (2013.01); *H04L 63/102* (2013.01); *H04W 12/02* (2013.01)

(56) References Cited

U.S. PATENT DOCUMENTS

| | | | |
|---|---|---|---|
| 8,352,364 B2 | 1/2013 | Reardon | |
| 9,521,125 B2* | 12/2016 | Schulz | ................ H04L 63/0414 |
| 9,716,981 B2 | 7/2017 | Park et al. | |
| 2009/0037990 A1* | 2/2009 | Zeng | ........................ G06F 21/33 726/6 |
| 2012/0159577 A1* | 6/2012 | Belinkiy | ............. G06F 21/6218 726/4 |
| 2014/0223575 A1 | 8/2014 | Nandi et al. | |
| 2018/0013567 A1* | 1/2018 | Davis | ................... H04L 9/0637 |

FOREIGN PATENT DOCUMENTS

| | | |
|---|---|---|
| JP | 2012022708 A | 2/2012 |
| JP | 2014522009 A | 8/2014 |
| JP | 2016512635 A | 4/2016 |
| WO | WO 2007024970 A2 | 3/2007 |
| WO | WO 2013048674 A1 | 4/2013 |
| WO | WO 2015013522 A1 | 1/2015 |

OTHER PUBLICATIONS

Camenisch et al., "Design and Implementation of the idemix Anonymous Credential System", pp. 21-30 (Year: 2002).*
Bauer et al., "Minimal Information Disclosure with Efficiently Verifiable Credentials", pp. 15-24 (Year: 2008).*
Mohamad Sbeiti et al: "Performance evaluation of PASER efficient secure route discovery approach for wireless mesh networks", 2012 IEEE 23rd International Symposium on Personal, Indoor and Mobile Radio Communications (PIMRC 2012); Sydney, Australia, Sep. 9-12, 2012, IEEE, Piscataway, NJ, Sep. 9, 2012 (Sep. 9, 2012), pp. 745-751, XP032273075.

* cited by examiner

DIGITAL IDENTITY

CROSS-REFERENCE TO RELATED APPLICATIONS

Priority is claimed to European Patent Application No. EP 16 020 338.6, filed on Sep. 20, 2016, the entire disclosure of which is hereby incorporated by reference herein.

FIELD

The present invention refers to a system and a method for providing a user with an access to different services of one or more service providers in a network.

BACKGROUND

In recent years, there have been several approaches by operators and their industrial associations (GSMA) to strengthen their position in the value chain as identity provider of the digital world. The last approach is called Mobile Connect and uses the subscriber identity module (SIM) or its derivatives for a secure identification and authentication of a customer and offers respective application programming interfaces (APIs) to service providers (like Spotify or Banks) to enable a secure and easy login process. Nevertheless, Facebook and Google are front runners in this area, because of their global reach.

In addition, they are favored by the Over The Top (OTT) services like online shops or streaming services as partner for identity and login because Facebook/Google deliver several personal information and preferences about the user/customer to the respective service provider.

For operators, there is a chance to become the advocate of the consumer with a privacy and security proposition which gives more control about personal data to the consumer, which is the main issue of Facebook and Google. Operators are perceived as more reliable with regard to privacy and security in comparison to OTT competitors (especially for financial institutions). And in fact they are more reliable in most of the cases because they have to follow standards of their related regulating authorities. However, existing and currently proposed solutions by the operators are subscriber-related and not user-related (e.g., based on SIM or embedded SIM (eSIM)). Thereby, user devices need to support the hardware-based solution of the respective operators, besides, users cannot simply share their devices.

SUMMARY

In an exemplary embodiment, the present invention provides a system for providing a user with access to different services of at least one service provider in a network considering privacy and security via a user-related unique digital identifier (D-ID). The system includes: a D-ID middleware; and a D-ID-agent. The D-ID agent is at least partly run on a terminal device of a user and is configured to: generate the D-ID, at least one pseudonym for the user, and a user-defined and pseudonym-specific number of secrets; compute, using the number of secrets and a cryptographic hash function, a root value of a pseudonym-specific Merkle-tree having the secrets as its leafs; transmit the at least one pseudonym and the corresponding root value, both encrypted, to the D-ID middleware; and use a secret of the number of secrets as needed to access a desired service of the different services of the at least one service provider. The D-ID middleware is run by an operator and constitutes middleware between the terminal device of the user and the at least one service provider with respect to a verification of the D-ID of the user, and the D-ID middleware is configured to receive and maintain the D-ID of the user, a Merkle-tree root element for each of the at least one pseudonym for the user, the root element comprising the respective pseudonym and the corresponding root value, and a trust level for each root element. The D-ID agent is further configured to reveal to the at least one service provider a secret of the pseudonym-specific number of secrets and a corresponding authentication path as derived from the pseudonym-specific Merkle-tree for access of the desired service by the user and in response to the user selecting one of the at least one pseudonym. The at least one service provider is configured to forward the pseudonym to the D-ID middleware in order to receive the corresponding root value and trust level, and compute based on the secret and the authentication path a root value and verifies if it is matching with the root value it has received from the D-ID middleware for the pseudonym so as to verify that the user is the owner of the pseudonym, and if the user is verified as the owner of the pseudonym, to allow to the user access to the desired service of the different services in the case that the trust level of the selected pseudonym corresponds to that one required by the at least one service provider.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
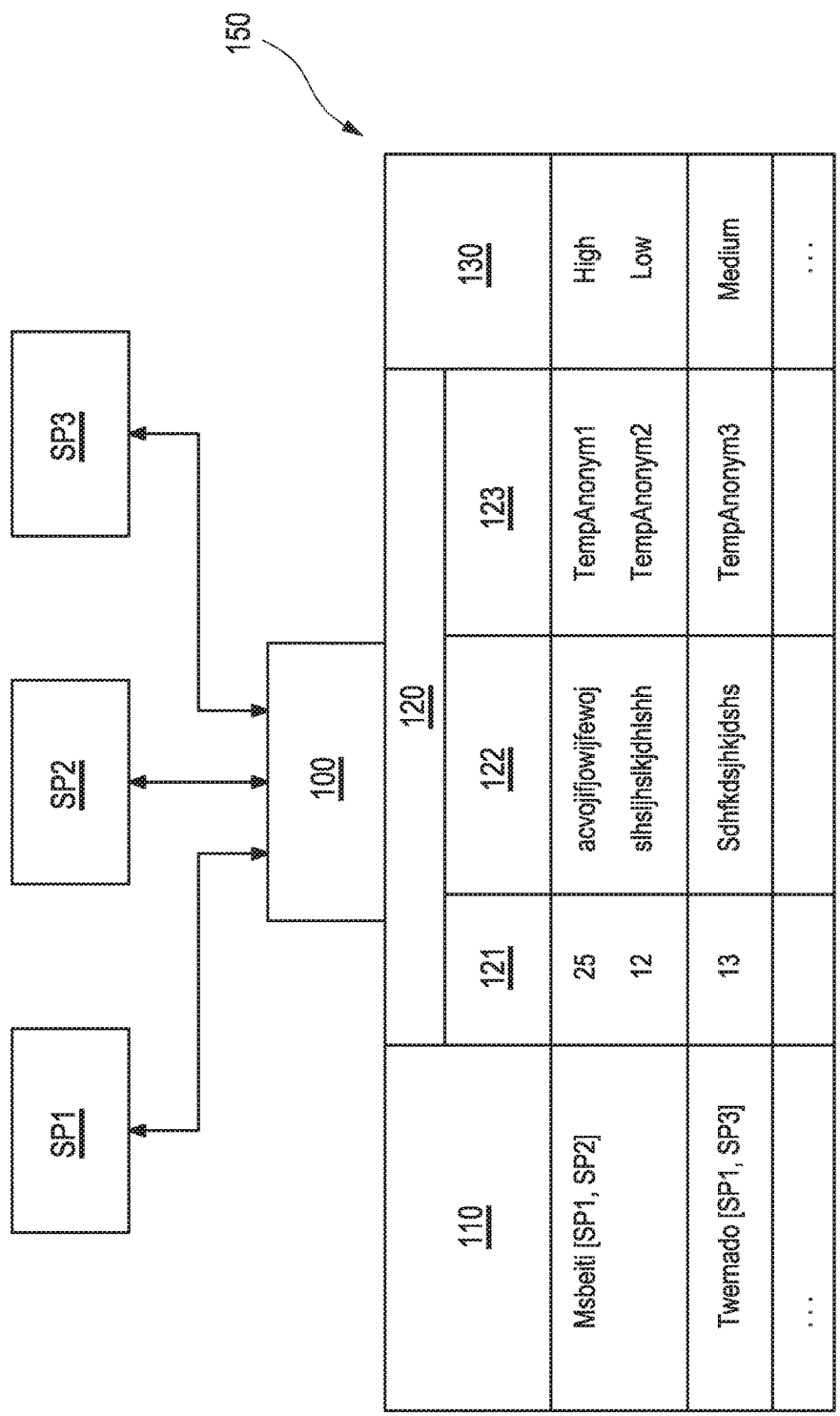
FIG. 1 gives a schematic overview of the information maintained by a D-ID middleware as provided by an embodiment of the system according to the present invention.

Exemplary embodiments of the present invention enable a user to access different services within a network in consideration of user-centric privacy but without the need to generate, store and manage too many passwords.

The present invention provides a system for providing a user with a respective access to different services of at least one service provider in a network in consideration of privacy and security via one sole user-related unique digital identifier (D-ID).

The system comprises at least a D-ID middleware and a D-ID-agent.

The D-ID agent is run solely by the user, generally at least partly on any desired terminal device of the user, and is configured to generate the D-ID, at least one pseudonym for the user and a user-defined and pseudonym-specific number of secrets, to compute, using the number of secrets and a cryptographic hash function, a root value of a pseudonym-specific Merkle-tree having the secrets as its leafs, to transmit the at least one pseudonym and the corresponding root value, both encrypted using an authentication and encryption method, to the D-ID middleware and to use a secret of the number of secrets as needed to access one service of the different services of the at least one service provider.

The user can chose any suitable terminal device, i.e. any electronic or electromechanical hardware device on which the D-ID agent can be at least partly executed. Thus, the D-ID agent can be run on a mobile phone, a laptop, etc. The D-ID agent can be executed onto different processors.

The D-ID middleware is run by an operator and constitutes the middleware between the terminal device of the user and the at least one service provider with respect to a verification of the D-ID of the user. The D-ID middleware is configured to receive and maintain the D-ID of the user, for each of the at least one pseudonym for the user a Merkle-tree root element comprising the respective pseudonym and the corresponding root value, and a trust level for each root element.

The system is configured such that, whenever the user intends to access one desired service of the different services, the user has to select one of the at least one pseudonym and on the basis of the selected pseudonym, the D-ID agent reveals a secret of the pseudonym-specific number of secrets and a corresponding authentication path which is derived from the pseudonym-specific Merkle-tree to the service provider, the service provider forwards the pseudonym to the D-ID middleware in order to receive the corresponding root value and trust level, and computes based on the secret and the authentication path a root value and verifies if it is matching with the root value it has received from the D-ID middleware for the pseudonym, thus verifying that the user is the owner of the pseudonym and if yes, allowing the user to access the desired service in the case that the trust level of the selected pseudonym corresponds to that one required by the at least one service provider.

According to one embodiment of the proposed system, the D-ID is defined by the user and verified, such as via a personal ID by the D-ID middleware.

According to still another possible embodiment of the proposed system, the trust level is assigned by the middleware based on the way the at least one pseudonym and the corresponding root value are transmitted from the D-ID agent to the D-ID middleware.

Further, for each root element, the middleware is configured to store, besides the respective pseudonym and the corresponding root value, a current secret-counter.

At the time the at least one pseudonym is generated, the secret-counter is set to zero and increased automatically by one each time the user uses a secret of the pseudonym-specific number of secrets.

As to the D-ID middleware, summarized it can be stated that the D-ID middleware is the middleware between the user (i.e. the respective terminal device of the user which the user actually uses to access a desired service) and the service providers with respect to the verification of the user's ID. The D-ID middleware could be run, for example, by a telco operator but also by any other organization. FIG. 1 which will be described later, provides an overview of the information maintained by the D-ID middleware. The D-ID middleware manages the following information about its users:

The D-ID of the user, which is a unique identifier that could be chosen by the user and verified (e.g., via a personal ID) by the provider of the D-ID middleware.

Several Merkle-tree root elements for each user (these are generated by the user and transmitted to the middleware) as well as the corresponding trust level of each root element (this is assigned by the middleware based on the transmission method, i.e. the used authentication and encryption method).

For each root element, the following parameters are stored:

A user pseudonym

The corresponding root element value (root value)

The current secret-counter (S-Counter)

Hereafter, the three pieces of information listed above are designated as root element. Note also that the secret-counter, in the following also called S-counter, is always zero at the beginning and it increases by one, each time the user uses a secret in order to get access to a service.

According to a further embodiment, each secret of the pseudonym-specific number of secrets is made up on the basis of the pseudonym, the current secret-counter (i.e. the current value of the secret-counter) and a random value.

According to still another embodiment of the system according to the present invention, each secret of the pseudonym-specific number of secrets is a one-time secret which can only be used once to access a service of a service provider.

It is possible that the user can generate different pseudonyms for corresponding different types of services. However, it is also possible that the user generates different pseudonyms for the same type of services. That means that the user can generate for each service at least one pseudonym and, thereby, the service provider and others can never track the user activity.

In one possible embodiment of the system according to the present invention, the D-ID agent is partly run in a secure cloud. That means that the D-ID agent is partly run on a respective terminal device of the user that the user actually uses to get access to a desired service and partly run in the secure cloud.

The system according to the present invention leads to the following quality characteristics:

It is device and authentication method-agnostic; the user can use his smartphone, laptop, IoT (Internet of Things), or others together with any legacy or new authentication method.

It is user-centric, the user has a large control over D-ID and its privacy.

It features post-quantum security mechanisms with low computation overhead.

It is dynamic, i.e., it might be changed in real time, also its trust level can be dynamically changed.

It is easily shareable at transaction level.

By using the system according to the present invention, the user is enabled by using the one sole user-related unique digital identifier (D-ID) to get a respective access—from one terminal device or from different terminal devices—to different services provided by different service providers which, moreover, require different security/trust levels. The system even enables the user to achieve privacy not only with respect to a third party but even to the respective service providers.

Quantum computing studies theoretical computation systems (quantum computers) that make direct use of quantum-mechanical phenomena, such as superposition and entanglement, to perform operations on data. Large-scale quantum computers would theoretically be able to solve certain problems much more quickly than any classical computers that use even the best currently known algorithms, like integer factorization using Shor's algorithm. There exist quantum algorithms, such as Simon's algorithm, that run faster than any possible probabilistic classical algorithm. On the other hand, quantum computers may be able to efficiently solve problems which are the basis for a lot of cryptographic methods and, thus, would render those cryptographic methods unfeasible. However, the system and method according to the present invention provide post-quantum security as both use hash-based cryptography in the form of a Merkle tree, and hash-based cryptography is secure against quantum computers (see, for example, https://en.wikipedia.org/wiki/Post-quantum_cryptography).

The present invention also refers to a method for providing a user with an access to at least one, generally to different services of at least one service provider in a network with guarantee of privacy and security via one sole user-related unique digital identifier (D-ID). The method comprises at least the following steps:
  providing a D-ID agent running at least partly on any desired terminal device of the user,
  generating, by the D-ID agent, the D-ID of the user, at least one pseudonym for the user and a user-defined and pseudonym-specific number of secrets,
  computing, by the D-ID agent, using the number of secrets and a cryptographic hash function, a root value of a pseudonym-specific Merkle-tree having the secrets as its leafs,
  transmitting, by the D-ID agent, the at least one pseudonym and the corresponding root value, both encrypted, using an authentication and encryption method, to a D-ID middleware,
  providing the D-ID middleware as middleware between the user and the at least one service provider with respect to a verification of the D-ID of the user,
  receiving and maintaining, by the D-ID middleware, the D-ID of the user, for each of the at least one pseudonym for the user a Merkle-tree root element comprising the respective pseudonym and the corresponding root value, and a trust level for each root element, and
  when the user intends to access one desired service of the different services of the at least one service provider, selecting one of the at least one pseudonym, revealing, by the D-ID agent, a secret of the pseudonym-specific number of secrets and a corresponding authentication path as derived from the pseudonym-specific Merkle-tree to the service provider, forwarding, by the service provider, the pseudonym to the D-ID middleware in order to receive the corresponding root value and trust level, and computing, by the service provider, based on the secret and the authentication path, a root value and verifying, by the service provider, if it is matching with the root value it has received from the D-ID middleware for the pseudonym, thus verifying that the user is the owner of the pseudonym and if yes, allowing to the user access to the one desired service in the case that the trust level of the selected pseudonym corresponds to that one required by the at least one service provider.

According to an embodiment of the method of the present invention, the trust level is assigned by the middleware based on the way the at least one pseudonym and the corresponding root value are transmitted from the D-ID agent to the D-ID middleware.

Thereby, it is further possible that the trust level is updated by using another authentication and encryption method when transmitting the at least one pseudonym and the corresponding root value, both encrypted, to the D-ID middleware. The authentication method/protocol is typically a method that is used to identify, i.e. verify the identity of the user, and in best case to make sure that the user is active (no replay attack). Examples for such authentication methods are Kerberos, IPsec, certificates-based Secure Sockets Layer (SSL), password-based SSL, any Single Sign On Solution, etc. Encryption methods are used to encrypt the data. Typically, during the authentication method, keys are derived, which are then used by the encryption method. Examples for such encryption methods are AES, SNOW, 3G or any ciphering mechanism.

In the case when the user intends to access one desired service of the different services of the at least one service provider, the service provider also receives from the D-ID middleware a secret counter of the last used secret and further verifies that the secret counter of the current selected secret is equal or greater than the secret counter of the last used secret.

According to still another embodiment of the claimed method, in case billing is required to access the desired service and the service provider is not allowed to get the D-ID of the user, the billing information is took over by the D-ID middleware and the D-ID middleware is acting as a billing proxy.

The following detailed description and accompanying drawings provide a better understanding of the nature and advantages of the present invention.

FIG. 1 gives a schematic overview of the information maintained by a D-ID middleware 100 as provided by an embodiment of the system according to the present invention. The D-ID middleware 100 represents a middleware between one or more users and service providers SP1, SP2 and SP3. The D-ID middleware maintains the respective D-ID of the one or more users as shown in column 110 of table 150. Each line of table 150 is assigned to one user. Each user has one D-ID which the respective user can define itself. Column 110 further indicates which service provider of the service providers SP1, SP2 and SP3 is allowed to know the D-ID of a respective user, respectively. The service providers SP1 and SP2 are allowed to know the D-ID "Msbeiti" of user A as indicated in the first line of column 110. The other service providers such as service provider SP3, get only aware of a pseudonym of user A. The service provides SP1 and SP3 are allowed to know the D-ID "Twernado" of user B as indicated in the second line of column 110. The other service providers such as service provider SP2, get only aware of a pseudonym of user B. The D-ID middleware can store and maintain further D-IDs and respective allowances for respective service providers as indicated in the third line of column 110 by " . . . ". In column 120, it is indicated that the D-ID middleware further manages root elements for the different users. Each root element comprises at least a current secret counter as shown in column 121, a root value as indicated in column 122 and a pseudonym as shown in column 123. In the example shown here, user A which is assigned to the first line of table 150 has two pseudonyms TempAnonym1 and TempAnonym2 as listed in the first line of table 150, column 123. For each pseudonym, exactly one root value (shown in column 122) is generated and stored. For pseudonym "TempAnonym1", root value "acvojifjowijfewoj" is generated. For pseudonym "TempAnonym2", root value "slhsljhslkjdhlshh" is generated. The root values are generated by a D-ID agent. A pseudonym, its corresponding root value and a current secret counter form together a root element which is built and transmitted by the D-ID agent to the D-ID middleware 100 by using a specific transmission method. The D-ID middleware assigns, based on the transmission method, each root element to a specific trust level as shown in column 130. That means, for example that the root element (25, acvojifjowijfewoj, TempAnonym1) is assigned to trust level "High", the root element (12, slhsljhslkjdhlshh, TempAnonym2) is assigned to trust level "Low". Both these root elements are assigned to the user A with the D-ID "Msbeiti".

User B with pseudonym "Twernado" is assigned the root element (13, Sdhfkdsjhkjdshs, TempAnonym3). The D-ID middleware assigns trust level "Medium" to this root element.

The different service providers SP1, SP2 and SP3 require different trust levels. Service provider SP1 requires trust level "high", SP2 trust level "medium" and SP3 trust level "low". Only if the trust level of a pseudonym corresponds to that one required by the respective service provider from whom a respective service is requested, the user (and owner of this pseudonym) can get access to the service providing that all the other access conditions are fulfilled.

Figure 2:
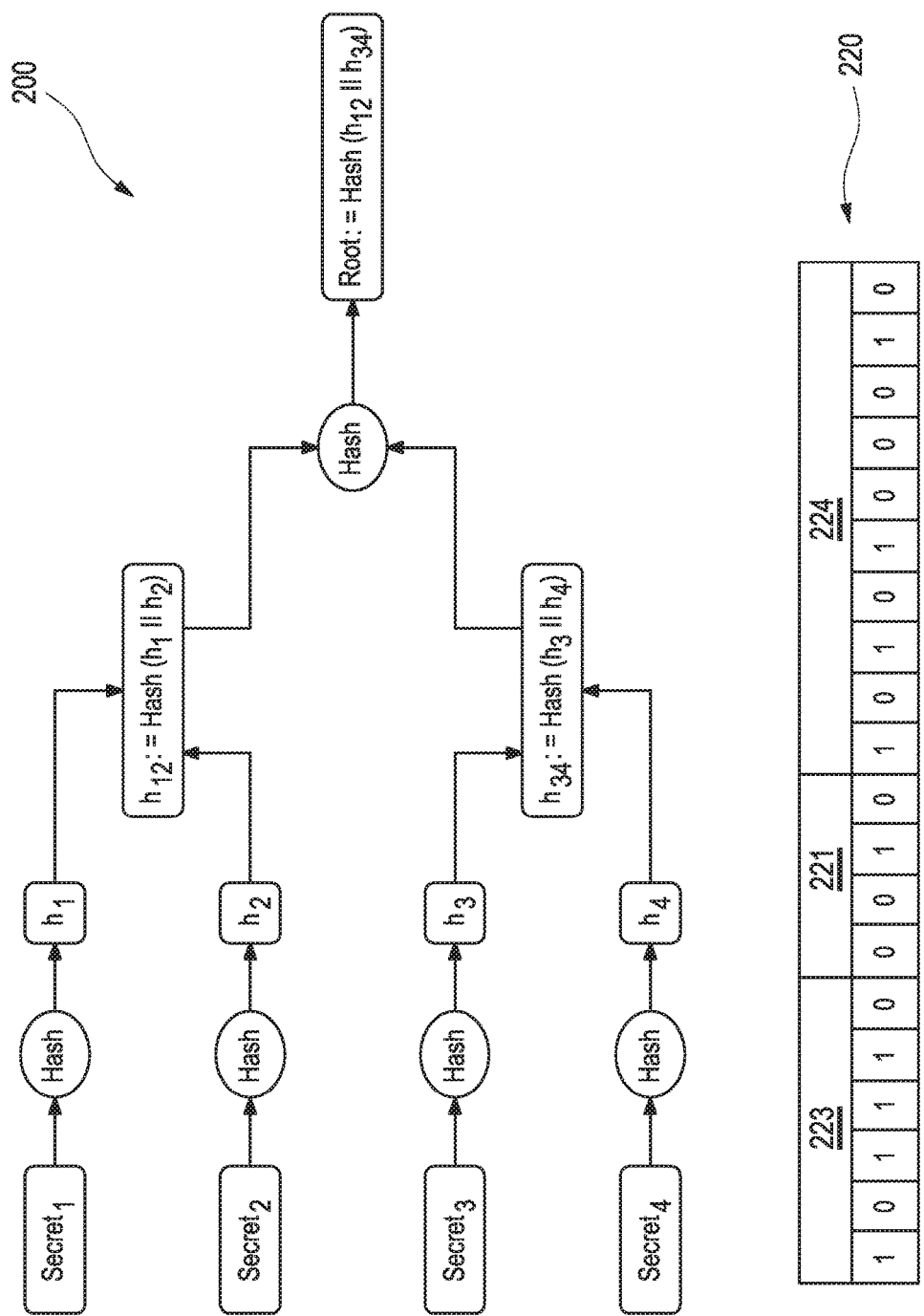
FIG. 2 shows an example of a Merkle tree as generated by a D-ID agent as provided by another embodiment of the system according to the present invention.

FIG. 2 schematically shows a generation process of a root element as provided for each user when using an embodiment of the system according to the present invention. Whenever a user wishes, a D-ID agent generates $2^n$ secrets wherein n is a configuration parameter specified by the user. Each secret has a format 220 as depicted in the bottom of FIG. 2. Thus, a secret is composed of a pseudonym 223 of the user, a secret counter 221 and a random value 224.

Using those secrets and a cryptographic hash function, the D-ID agent computes a root value of a Merkle tree 200 having the secrets as it leafs. In the example shown here, the user has specified the configuration parameter n as "2" so that the D-ID agent generates four secrets $Secret_1$, $Secret_2$, $Secret_3$ and $Secret_4$. By applying a hash function "Hash" to each secret, four values $h_1$, $h_2$, $h_3$ and $h_4$ are generated, respectively. Respective two values $h_1$ and $h_2$, and $h_3$ and $h_4$ are combined, respectively, such forming the two values $h_{12}$ and $h_{34}$, respectively. Those two values $h_{12}$ and $h_{34}$ are combined by applying the function "Hash" resulting in the root value.

Figure 3:
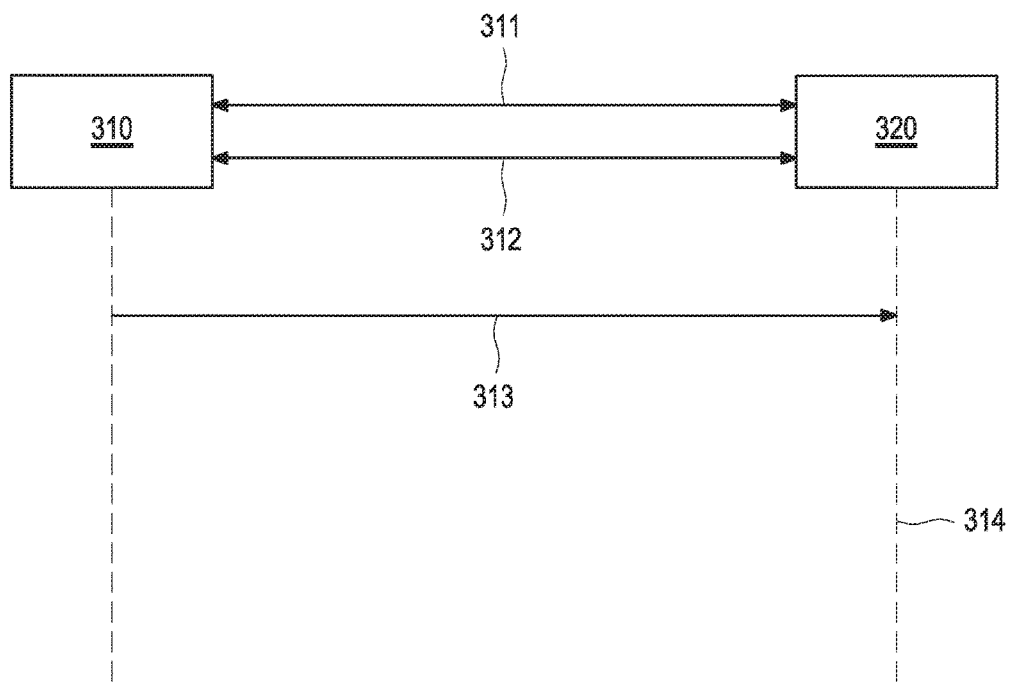
FIG. 3 shows schematically an information exchange between a D-ID agent and a D-ID middleware as provided by still another embodiment of the system according to the present invention.

FIG. 3 indicates an example exchange between a D-ID agent 310 and a D-ID middleware 320 as provided by an embodiment of the system according to the present invention. The D-ID agent 310 generates a D-ID for a respective user or the respective user defines and specifies a D-ID and the D-ID agent 310 transmits this D-ID using any supported device and an authentication method 311 to the D-ID middleware 320. Further, the D-ID agent 310 transmits a pseudonym selected by the respective user via an encrypted pseudonym negotiation 312 to the D-ID middleware 320. The D-ID agent 310 verifies through the D-ID middleware 320 that the pseudonym is unique, otherwise the D-ID agent 310 regenerates it. Afterwards, the D-ID agent 310 submits a root value 313 corresponding to the newly generated pseudonym to the D-ID middleware 320. As authentication method SIM, password, biometric, etc. can be used. Note that a user can generate different pseudonyms: one for education, one for sport, etc.

Based on the way the pseudonym and the corresponding root value are transmitted to the D-ID middleware 320, the D-ID middleware 320 assigns a trust level. With "transmission way", authentication method and device type are meant.

In a step 314, the D-ID middleware 320 updates a table which the D-ID middleware maintains for different users, as shown, for example, in FIG. 1.

Figure 4:
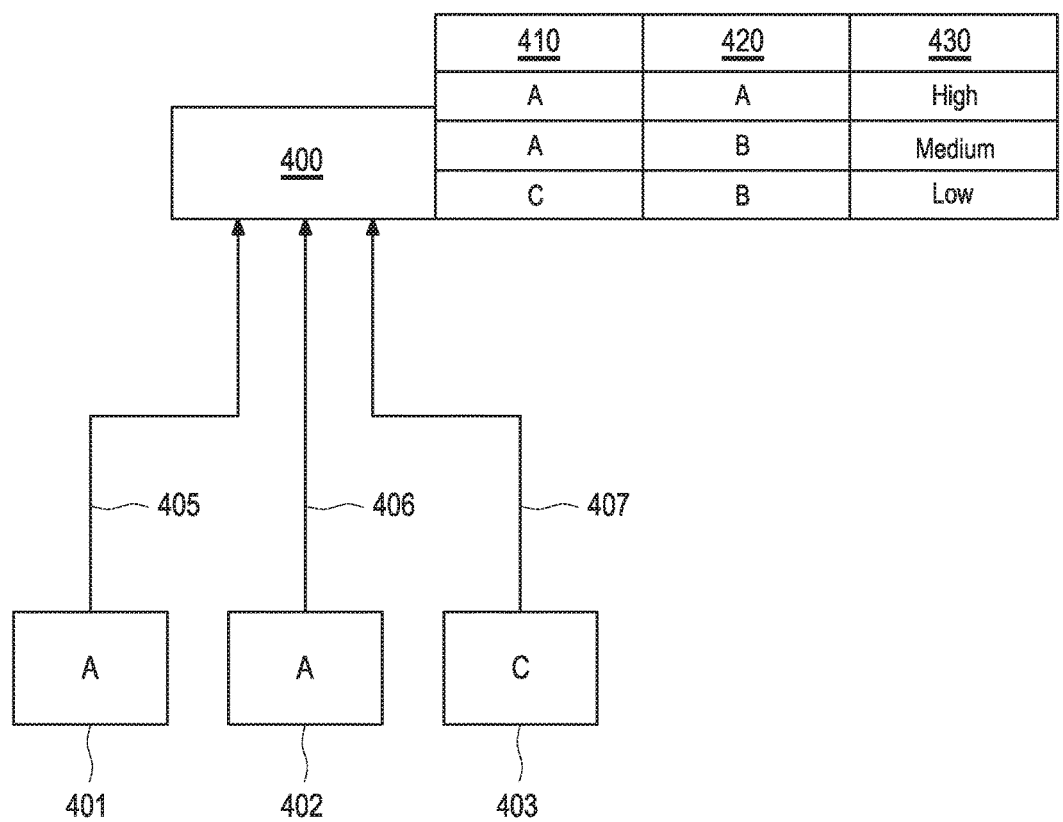
FIG. 4 shows exemplarily an assignment of trust levels as performed by a D-ID middleware as provided by still a further embodiment of the system according to the present invention.

FIG. 4 describes an assignment of trust levels. The D-ID agent uses different devices, i.e. the D-ID-agent runs at least partly on different devices. It uses device A in the cases 401 and 402 and device C in case 403. Further, it uses different authentication methods, authentication method A or authentication method B, in order to transmit the D-ID of a user to the D-ID middleware 400. In a first transmission way 405, the D-ID agent uses device A and authentication method A, in a second transmission way 406, the D-ID agent uses device A and authentication method B and in a third transmission way 407, the D-ID agent uses device C and authentication method B. The D-ID middleware 400 stores for each transmission way used by the D-ID agent, i.e. for each combination of device type 410 and authentication method 420, a respective trust level 430 as indicated in the table.

The combination "authentication method A/device type A" is assigned the trust level "High". The combination "authentication method A/device type B" is assigned to the trust level "Medium". The combination "authentication method C/device type B" is assigned to the trust level "Low".

Figure 5:
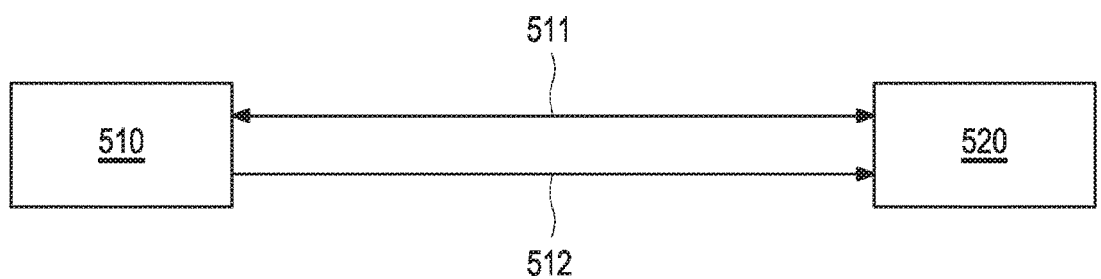
FIG. 5 shows exemplarily an updating of a trust level of a pseudonym as performed by a D-ID middleware as provided by still a further embodiment of the system according to the present invention.

FIG. 5 shows schematically how a trust level of a pseudonym of a user can be changed and adjusted to any requirements, as for example, to the requirements of a service provider whose service the user wants to access. The user, i.e. the D-ID agent 510 can anytime use another device and/or another authentication method 511 when submitting the pseudonym and the corresponding root value to the D-ID middleware 520 to adjust the trust level of an existing root element 512.

Figure 6:
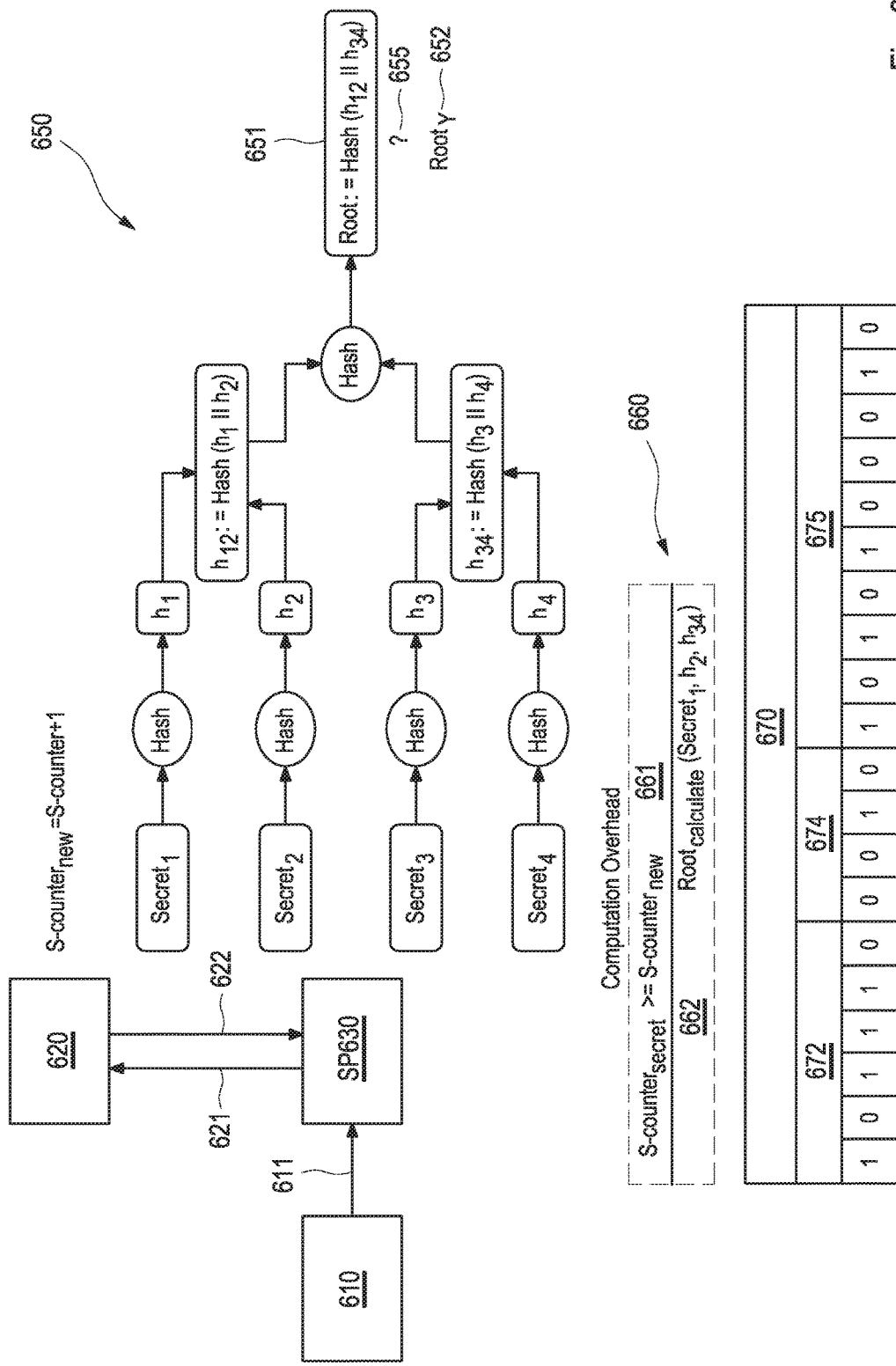
FIG. 6 schematically shows a block diagram describing the functionality of an embodiment of the claimed system.

FIG. 6 schematically shows a block diagram describing the functionality of an embodiment of the claimed system.

FIG. 6 shows a D-ID agent 610, a D-ID middleware 620 and a service provider SP 630. A user wants to access a service which is provided by the service provider SP 630. For use of the service, the service provider SP 630 requires a trust level "High". Whenever the user wants to access the service of the service provider SP 630, he selects one of the pseudonyms he wants to use for that service, the D-ID agent 610 then reveals in a step 611 a secret $Secret_1$ and a corresponding authentication path ($Secret_1$, $h_2$, $h_{34}$) (which is derived from an appropriately generated and stored Merkle tree) to the service provider SP 630. The service provider SP 630 forwards in step 621 the pseudonym to the D-ID middleware 620 in order to receive in step 622 the corresponding root value, the trust level, the counter of the last used secret, and if allowed the D-ID. Based on the $Secret_1$, $h_2$ and $h_{34}$, the service provider SP 630 computes itself in step 662 a root value 652 and verifies in step 655 if it matches with the root value 651 the service provider SP 630 has received from the D-ID middleware 620 for that pseudonym, whereby the root value 651 results from the Merkle tree 650 which has been generated by the D-ID agent 610 and stored by the D-ID middleware 620. The way how the root value 651 is derivable from the Merkle tree 650, is indicated via a hachure. If root value 651 and root value 652 are equal, and if the secret counter of $Secret_1$ equals S-counter$_{new}$ in step 661, the service provider SP 630 can be sure in step 660 that the secret Secret$_1$ is fresh and that the user/D-ID agent 610 is the owner of that pseudonym (without knowing the identity of the user). As a result, if the trust level of the pseudonym corresponds to that of the one required to access the service of the service provider SP 630, the user gets access to the service. Each time the service provider SP 630 successfully verifies a user, i.e. its secret, pseudonym, root value, after contacting the middleware 620, the D-ID middleware 620 increases the S-counter by one, i.e. only in case of a successful verification, the S-counter is increased. In case billing is required to access the service and the service provider SP 630 is not allowed to get the D-ID of the user, the billing information is took over by the D-ID middleware, i.e., the D-ID middleware 620 acts as a billing proxy. The computation overhead is indicated by 660. The secret construction of Secret$_1$ is designated as 670, whereby the secret is composed of the pseudonym 672, the S-counter 674 and a random value 675.

Thus, the identity of the user is not revealed to the service provider SP 630. Besides, using Merkle trees such as Merkle tree 650, the system is robust against quantum computers. On top of that, the computation overhead 660 for the verification in FIG. 6 is more than 50 times faster than asymmetric crypto which are widely used in this context as described, for example in Sbeiti M. et al. "Performance evaluation of PASER—an Efficient Secure Route Discovery Approach for Wireless Mesh Networks", IEEE, PIMRC, Sydney, Australia, 2012. Apart from that, if the D-ID agent 610 was partly run in a cloud, i.e., the secrets are stored in a secure cloud, users can simply share theirs devices. The user enter his D-ID in the D-ID agent 610 running on any device and the D-ID agent will take care of all the rest, and only the current user will be billed (similar to temporarily using a computer in a Rechenzentrum).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for providing a user with access to different services of at least one service provider in a network considering privacy and security via a user-related unique digital identifier (D-ID), the system comprising:
   a D-ID middleware; and
   a D-ID agent;
   wherein the D-ID agent is at least partly run on a terminal device of the user and is configured to:
      generate the D-ID, at least one pseudonym for the user, and a user-defined and pseudonym-specific number of secrets;
      compute, using the user-defined and pseudonym-specific number of secrets and a cryptographic hash function, a root value of a pseudonym-specific Merkle-tree having the secrets as leafs of the pseudonym-specific Merkle-tree;
      transmit the at least one pseudonym and the root value, both encrypted, to the D-ID middleware; and
      use a secret of the user-defined and pseudonym-specific number of secrets to access a desired service of the different services of the at least one service provider;
   wherein the D-ID middleware is run by an operator and constitutes middleware between the terminal device of the user and the at least one service provider with respect to a verification of the D-ID of the user, and wherein the D-ID middleware is configured to receive and maintain the D-ID of the user, a Merkle-tree root element for each pseudonym of the at least one pseudonym for the user, and a trust level for each Merkle-tree root element, wherein the Merkle-tree root element for a respective pseudonym comprises the respective pseudonym and a corresponding root value;
   wherein the D-ID agent is further configured to reveal to the at least one service provider the secret of the user-defined and pseudonym-specific number of secrets and a corresponding authentication path as derived from the pseudonym-specific Merkle-tree for accessing the desired service by the user and in response to the user selecting a pseudonym of the at least one pseudonym;
   wherein the at least one service provider is configured to:
      forward the selected pseudonym to the D-ID middleware in order to receive a root value and a trust level corresponding to the selected pseudonym;
      compute, based on the secret and the corresponding authentication path, a computed root value;
      verify if the computed root value matches the root value corresponding to the selected pseudonym so as to verify that the user is the owner of the selected pseudonym; and
      if the user is verified as the owner of the selected pseudonym, allow the user to access the desired service of the different services in the case that the trust level corresponding to the selected pseudonym satisfies a trust level required by the at least one service provider.

2. The system according to claim 1, wherein the D-ID is defined by the user and verified by the D-ID middleware.

3. The system according to claim 1, wherein the trust level for each Merkle-tree root element is assigned by the D-ID middleware based on the way the at least one pseudonym and the root value are transmitted from the D-ID agent to the D-ID middleware.

4. The system according to claim 1, wherein for each Merkle-tree root element, the D-ID middleware is configured to store, besides the respective pseudonym and the corresponding root value, a current secret-counter.

5. The system according to claim 4, wherein at the time the at least one pseudonym is generated, the secret-counter is set to zero and increased automatically by one each time the user uses a secret of the user-defined and pseudonym-specific number of secrets.

6. The system according to claim 5, wherein each secret of the user-defined and pseudonym-specific number of secrets is made up on the basis of the at least one pseudonym, the current secret-counter and a random value.

7. The system according to claim 1, wherein each secret of the user-defined and pseudonym-specific number of secrets is a one-time secret which can only be used once to access a service of a service provider.

8. The system according to claim 1, wherein different pseudonyms are generated for corresponding different types of services.

9. The system according to claim 1, wherein the D-ID agent is partly run in a secure cloud.

10. A method for providing a user with access to different services of at least one service provider in a network considering privacy and security via a user-related unique digital identifier (D-ID), the system providing a D-ID agent running at least partly on a terminal device of the user, the method comprising:

generating, by the D-ID agent, the D-ID, at least one pseudonym for the user, and a user-defined and pseudonym-specific number of secrets;

computing, by the D-ID agent, using the user-defined and pseudonym-specific number of secrets and a cryptographic hash function, a root value of a pseudonym-specific Merkle-tree having the secrets as leafs of the pseudonym-specific Merkle-tree;

transmitting, by the D-ID agent, the at least one pseudonym and the root value, both encrypted, to a D-ID middleware, wherein the D-ID middleware is provided as middleware between the user and the at least one service provider with respect to a verification of the D-ID of the user;

receiving and maintaining, by the D-ID middleware, the D-ID of the user, a Merkle-tree root element for each pseudonym of the at least one pseudonym for the user, and a trust level for each Merkle-tree root element, wherein the Merkle-tree root element for a respective pseudonym comprises the respective pseudonym and a corresponding root value;

revealing, by the D-ID agent to the at least one service provider, a secret of the user-defined and pseudonym-specific number of secrets and a corresponding authentication path as derived from the pseudonym-specific Merkle-tree for accessing a desired service by the user and in response to the user selecting a pseudonym of the at least one pseudonym;

forwarding, by the at least one service provider, the selected pseudonym to the D-ID middleware in order to receive a root value and a trust level corresponding to the selected pseudonym;

computing, by the at least one service provider, based on the secret and the corresponding authentication path, a computed root value;

verifying, by the at least one service provider, if the computed root value matches the root value corresponding to the selected pseudonym, so as to verify that the user is the owner of the selected pseudonym; and if the user is verified as the owner of the selected pseudonym, allowing the user to access the desired service in the case that the trust level corresponding to the selected pseudonym satisfies a trust level required by the at least one service provider.

11. The method according to claim 10, wherein the trust level for each Merkle-tree root element is assigned by the D-ID middleware based on the way the at least one pseudonym and the root value are transmitted from the D-ID agent to the D-ID middleware.

12. The method according to claim 11, wherein the trust level for each Merkle-tree root element is updated when transmitting the at least one pseudonym and the root value, both encrypted, to the D-ID middle-ware.

13. The method according to claim 10, wherein, for access by the user to the desired service, the at least one service provider also receives from the D-ID middleware a secret counter of a last used secret and further verifies that a secret counter of a current selected secret is equal to or greater than the secret counter of the last used secret.

14. The method according to claim 10, wherein in case billing is required to access the desired service and the at least one service provider is not allowed to get the D-ID of the user, the D-ID middleware processes billing information.

15. The method according to claim 10, wherein the user reveals the secret and the corresponding authentication path to another user and the other user uses the secret and the corresponding authentication path to access the desired service once.

* * * * *